(12) United States Patent
Singh et al.

(10) Patent No.: US 11,488,737 B2
(45) Date of Patent: Nov. 1, 2022

(54) COOLING SYSTEM FOR CASKS CONTAINING HIGH LEVEL NUCLEAR WASTE

(71) Applicant: Holtec International, Camden, NJ (US)

(72) Inventors: Krishna P. Singh, Jupiter, FL (US); Debabrata Mitra-Majumdar, Springfield, PA (US); Abrar Hasan Mohammad, Marlton, NJ (US); John Griffiths, Deptford, NJ (US)

(73) Assignee: HOLTEC INTERNATIONAL

( * ) Notice: Subject to any disclaimer, the term of this patent is extended or adjusted under 35 U.S.C. 154(b) by 276 days.

(21) Appl. No.: 16/792,711

(22) Filed: Feb. 17, 2020

(65) Prior Publication Data

US 2020/0265966 A1 Aug. 20, 2020

Related U.S. Application Data

(60) Provisional application No. 62/806,144, filed on Feb. 15, 2019.

(51) Int. Cl.
| | | |
|---|---|---|
| *G21F 5/10* | (2006.01) | |
| *G21F 5/008* | (2006.01) | |
| *G21F 1/12* | (2006.01) | |

(52) U.S. Cl.
CPC ............ *G21F 5/10* (2013.01); *G21F 1/12* (2013.01); *G21F 5/008* (2013.01)

(58) Field of Classification Search
CPC ........... G21F 5/008; G21F 5/10; B65D 88/74; B65D 88/745
See application file for complete search history.

(56) References Cited

U.S. PATENT DOCUMENTS 3,902,548 A 9/1975 Bochard
4,067,771 A * 1/1978 Rubin .................. G21C 15/18
376/245

(Continued)

FOREIGN PATENT DOCUMENTS

CN 105620954 A * 6/2016
EP 0058956 10/1984

OTHER PUBLICATIONS

International Search Report and Written Opinion for International Application No. PCT/US20/18515 dated Sep. 18, 2020.

*Primary Examiner* — Sharon M Davis
(74) *Attorney, Agent, or Firm* — The Belles Group, P.C.

(57) ABSTRACT

A system for externally cooling a radiation shielded cask containing heat-emitting high level radioactive waste such as spent nuclear fuel. The system includes the cask defining an internal cavity configured to hold an unshielded canister containing the spent nuclear fuel. An annular cooling water header extends circumferentially around the entire circumference of the cylindrical sidewall of the cask. The header comprises plural dispensing outlets which direct cooling water onto the cask, thereby wetting the entire sidewall of the cask. The cooling water provides an external heat sink for absorbing the heat emitted through the external wall surface of the cask generated by the spent nuclear fuel. In various embodiments, the cooling water header may have a continuous annular structure, or be formed by two or more header segments. The header may be supported directly from the cask by detachably mounted brackets.

30 Claims, 15 Drawing Sheets

(56) References Cited

U.S. PATENT DOCUMENTS

| | | | |
|---|---|---|---|
| 4,450,134 A | 5/1984 | Soot et al. | |
| 4,634,875 A * | 1/1987 | Kugeler | G21F 9/34 |
| | | | 250/506.1 |
| 5,740,215 A * | 4/1998 | Gluschke | G21F 5/10 |
| | | | 376/272 |
| 2008/0265182 A1 | 10/2008 | Singh et al. | |
| 2015/0287483 A1 | 10/2015 | Singh et al. | |
| 2018/0358136 A1* | 12/2018 | Deng | G21C 9/012 |
| 2020/0027612 A1 | 1/2020 | Singh | |

* cited by examiner

COOLING SYSTEM FOR CASKS CONTAINING HIGH LEVEL NUCLEAR WASTE

CROSS-REFERENCE TO RELATED APPLICATIONS

This application claims the benefit of U.S. Provisional Application No. 62/806,144 filed Feb. 15, 2019, which is incorporated herein by reference in its entirety.

BACKGROUND

The present invention relates generally to casks used to transport and store canisters containing high level radioactive waste such as spent nuclear fuel (SNF) created by nuclear generating plants or other facilities.

In the operation of nuclear reactors, the nuclear energy source is in the form of hollow Zircaloy tubes filled with enriched uranium (aka fuel rods), collectively arranged in assemblages referred to as fuel assemblies. Each fuel assembly contains a multitude of the packaged fuel rods. When the energy in the fuel assembly has been depleted to a certain predetermined level, the fuel assembly is removed from the nuclear reactor. The standard structure used to package used or spent nuclear fuel assemblies discharged from light water reactors for off-site shipment or on-site dry storage is known as the fuel basket. The fuel basket is essentially an assemblage of prismatic storage cells, each of which is sized to store one fuel assembly that comprises a plurality of individual spent nuclear fuel rods. The fuel basket is arranged inside a radiation unshielded metallic storage canister (typically stainless steel). The multi-purpose canister (MPC) available from Holtec International of Camden, N.J. is one example of such a fuel storage canister. The canister may be placed in turn inside a radiation shielded outer overpack or cask for safe transport and storage of the multiple spent fuel assemblies within the canister's inner fuel basket.

The spent nuclear fuel ("SNF") in the fuel assemblies within the transport/storage cask is still highly radioactive and produces considerable heat which must be dissipated, in addition to concomitantly emitting dangerous ionizing neutron and gamma photons (i.e. neutron and gamma radiation) requiring protective shielding. Thus, caution must be exercised when the fuel assemblies are handled, transported, packaged and stored. Neutron radiation may be effectively attenuated with outer casks having metallic and polymeric shielding materials typically containing boron. These boron-containing materials however are not effective at attenuating and shielding gamma radiation emitted from the fuel baskets. Effective gamma radiation shielding requires very dense materials, such as lead, steel, concrete, copper, and combinations thereof to also be incorporated into the cask construction. The outer casks which house the spent nuclear fuel canister are thus very heavy and large structures with thick walls, typically weighing about 150 tons and about 15 feet or more high/long, and about 6 feet in internal diameter for housing the unshielded canister.

Transfer of the SNF from wet storage in the water impounded spent fuel pool of the nuclear facility to dry storage involves several operations to change the environment around the fuel from complete immersion in water to an inert gas such as helium. For example, the current practice in the United States is to package the SNF in the stainless-steel canister below water within the spent fuel pool which provides radiation shielding. The unshielded canister is placed inside the outer transfer cask which has been lowered into the fuel pool. The transfer cask along with the canister loaded with fuel assemblies and full of water is lifted out of the pool and set on the area often referred to as the "Decontamination and Assembly Station" (DAS) where the cask is pressure washed to remove surface contaminants. Hermetic seal welding of the closure lid to the top of the canister shell is carried out. The SNF in the canister is kept submerged in water. During this process, the canister to transfer cask annulus is also kept filled with water to provide additional shielding and to serve as the heat transmission bridge from the canister to the outside surface of the cask from which the heat is dissipated to the ambient environment by natural convection via the air and radiation.

The key requirement during the foregoing process when the canister still contains water is that the temperature of the water mass in the canister should be assured to remain below boiling. This is necessary because, during the lid-to-canister welding operation, the vapor from boiling water would adversely affect the quality of the lid to shell weld and integrity of the seal. After the lid has been fully welded, it becomes a closed pressure vessel whose internal pressure would rise uncontrollably creating an unsafe condition if the boiling of water continues to raise the internal pressure in the canister. Experience and computer simulations of typical modern canisters show that the natural convection from the transfer cask's external surface is adequate to keep the water sub-cooled, with no time limits on the operations, if the aggregate decay heat load in the canister is not greater than approximately 20 kW (kilowatts). At higher heat loads and under hot ambient conditions, however, the canister water may boil after a certain amount of time has elapsed, because natural thermal convection from the cask alone may not suffice to fully remove the heat generated by the SNF inside the canister.

Improvements in cooling high level radioactive waste such as SNF in the canister to prevent boiling is desired.

BRIEF SUMMARY

The present application discloses a system and related method for externally cooling a nuclear fuel cask and the canister with high level radioactive waste held therein which overcomes the foregoing problems. In one embodiment, the system may include a cooling water header which may be detachably and expediently mounted to the cylindrical external surface of the outer cask. The header has an annular circular shape and extends around the circumference of the cask, and may be continuous in structure for a full 360 degrees to completely encircle the cask for uniform cooling the entire external surface of the cask. The cooling water header may be provided as single prefabricated circular unit which can be slipped over the top end of the cask, or alternatively may be provided as multiple arcuately shaped sections or segments which may be assembled and fluidly coupled together in leak-resistant manner via suitable fluid end couplings after emplacement around the cask.

The cooling water header comprises a plurality of dispensing outlets configured to drip or spray cooling water supplied to the header onto the external surface of the cask which is wetted by the water. The outlets may each take the form of simply an opening or orifice in the header, or in other embodiments a spray nozzle configured to drip or spray the cooling water onto the cask.

One objective of the system and related methods proposed herein is to provide an entirely passive means to keep the canister water in a subcooled state under higher heat loads (which can reach as high as 50 kW) with no time limits during the wet transfer operations described above. Accordingly, in some embodiments, the cooling system may be passive in which the cooling water header is fluidly coupled to a water source comprising a reservoir such as a tank holding a supply of water. The tank delivers water at pressure to the header via the static pressure head created in the tank without the assistance of pump, thereby creating a passive system which does not rely on the availability of electric power for operation. The cooling water flows by gravity from the tank to the header and nozzles via the static pressure head. The flow rate of cooling water may decrease over time as cooling water is consumed and the surface level of remaining water in the tank continually drops.

In other embodiments, the header may be fluidly coupled to a pressurized source of water provided by one or more powered cooling water pumps (e.g. electrically driven or gasoline powered) which create a pressure head via operation of the pump. The pumps may take suction from any available source of cooling water, such as a reservoir such as a tank. The pumped cooling water can maintain a substantially uniform cooling water supply pressure to the spray nozzles, but requires the use of gasoline or electric power to drive the cooling water pumps.

In one aspect, a system for cooling high level radioactive waste comprises: a cask comprising an external surface and an internal storage cavity containing the high level radioactive waste; a cooling water header encircling the cask, the cooling water header fluidly coupled to a water source; and a plurality of circumferentially spaced apart water dispensing outlets arranged on the header, the dispensing outlets configured to direct cooling water supplied to the header onto the external surface of the cask to cool the cask.

In another aspect, an apparatus for cooling high level radioactive waste comprises: an annular cooling water header defining a central space configured to receive a cask comprising an external surface and an internal storage cavity containing the high level radioactive waste; a water supply line fluidly coupled to the cooling water header; and a plurality of circumferentially spaced apart water dispensing outlets arranged on the cooling water header, the dispensing outlets configured to direct cooling water inwards towards the central space.

In another aspect, a method of cooling high level radioactive waste comprises: surrounding a cask comprising an external surface and an internal storage cavity containing the high level radioactive waste which emits heat with a cooling water header; and discharging cooling water radially inwards from the cooling water header onto the cask from the plurality of water dispensing outlets arranged on the cooling water header.

Further areas of applicability of the present invention will become apparent from the detailed description provided hereinafter. It should be understood that the detailed description and specific examples, while indicating the preferred embodiment of the invention, are intended for purposes of illustration only and are not intended to limit the scope of the invention.

BRIEF DESCRIPTION OF THE DRAWINGS

The present invention will become more fully understood from the detailed description and the accompanying drawings, wherein like elements are labeled similarly and in which.

Figure 1:
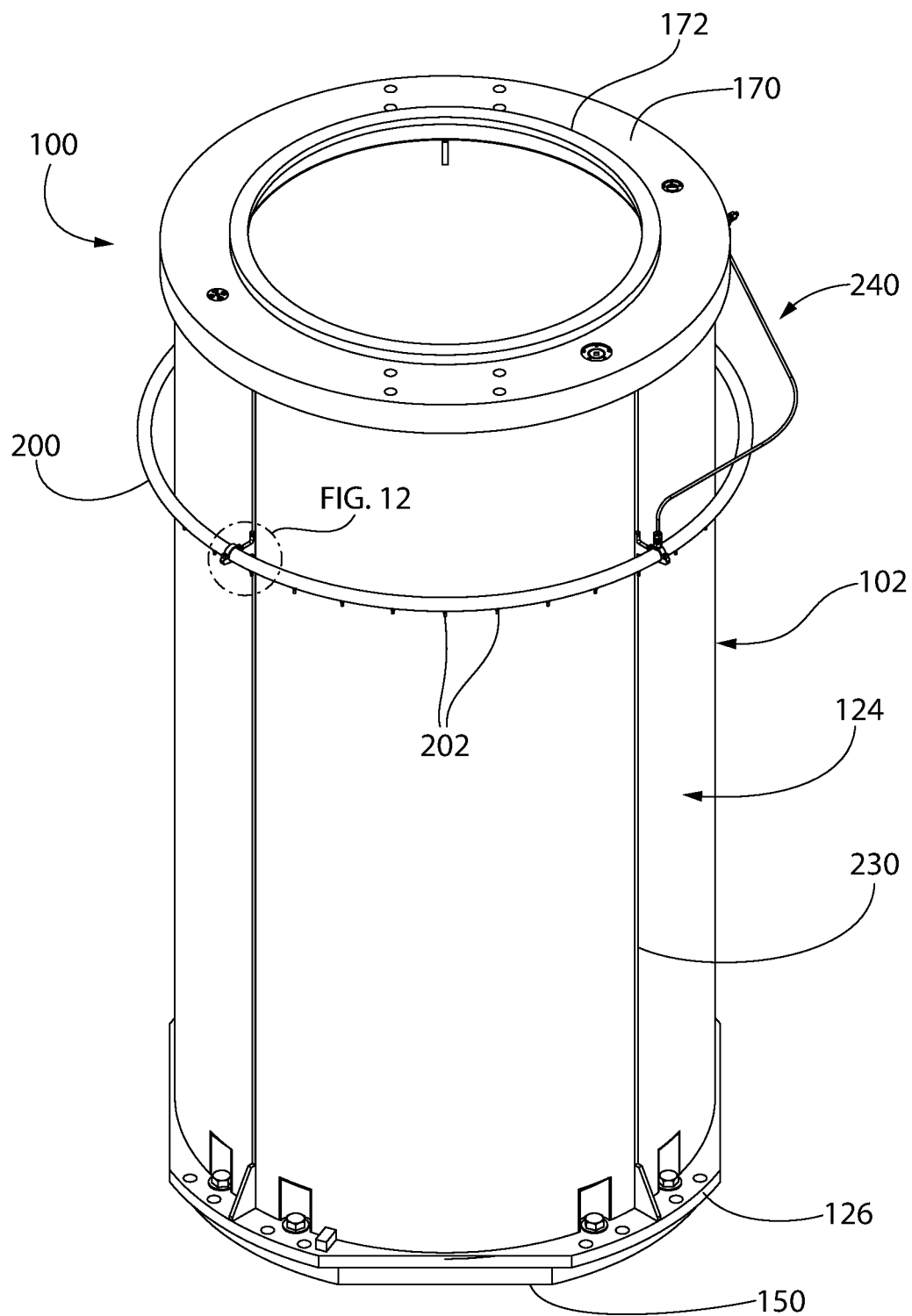
FIG. 1 is a top perspective view of a radiation-shielded cask for storage/transport of high level radioactive waste and showing a cooling water system according to the present disclosure.
Figure 2:
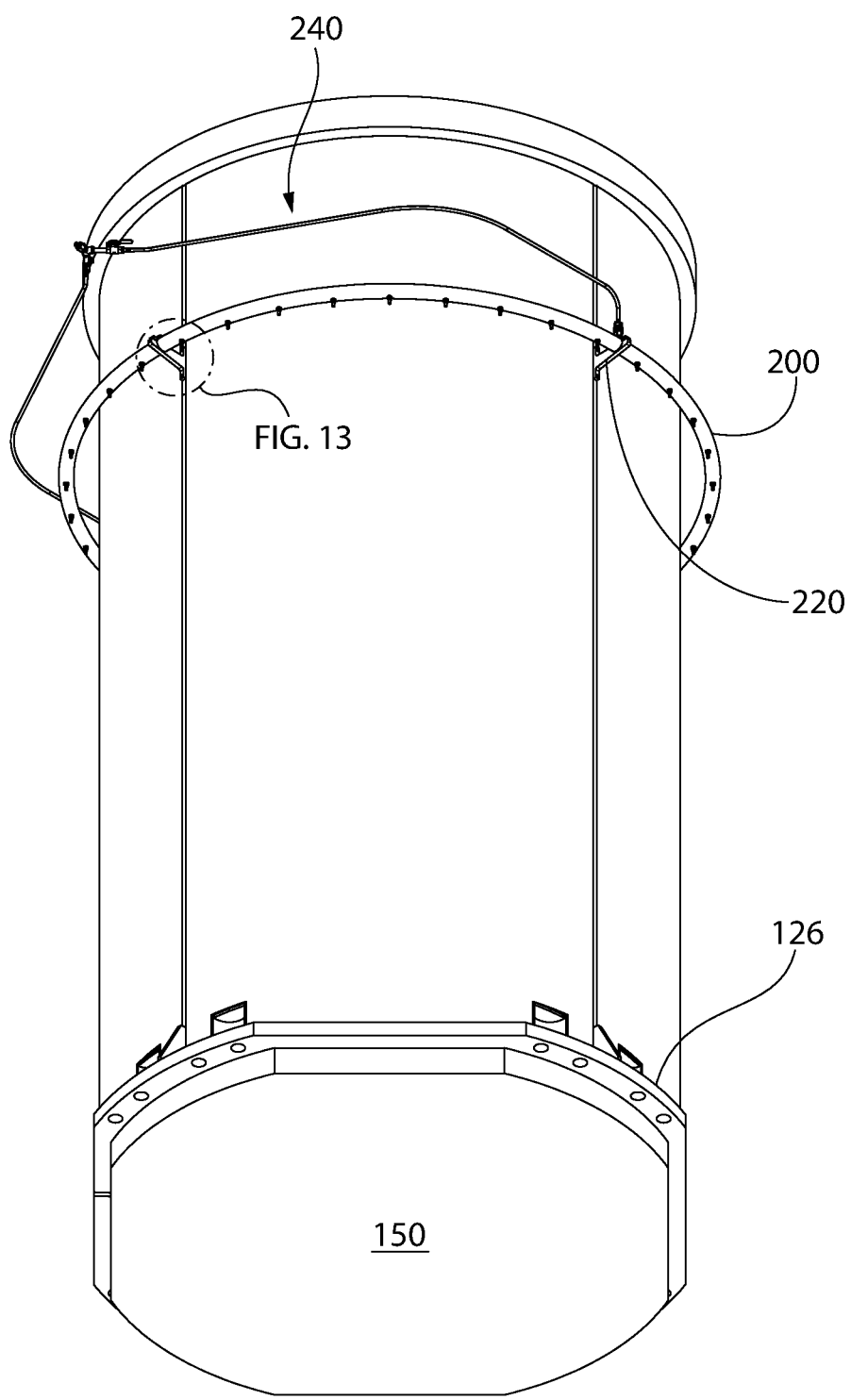
FIG. 2 is a bottom perspective view thereof.

All drawings are schematic and not necessarily to scale. Features shown numbered in certain figures are the same features which may appear un-numbered in other figures unless noted otherwise herein.

DETAILED DESCRIPTION

The features and benefits of the invention are illustrated and described herein by reference to exemplary (i.e. "example") embodiments. This description of exemplary embodiments is intended to be read in connection with the accompanying drawings, which are to be considered part of the entire written description. Accordingly, the disclosure expressly should not be limited to such exemplary embodiments illustrating some possible non-limiting combination of features that may exist alone or in other combinations of features.

In the description of embodiments disclosed herein, any reference to direction or orientation is merely intended for convenience of description and is not intended in any way to limit the scope of the present invention. Relative terms such as "lower," "upper," "horizontal," "vertical,", "above," "below," "up," "down," "top" and "bottom" as well as derivatives thereof (e.g., "horizontally," "downwardly," "upwardly," etc.) should be construed to refer to the orientation as then described or as shown in the drawing under discussion. These relative terms are for convenience of description only and do not require that the apparatus be constructed or operated in a particular orientation. Terms such as "attached," "affixed," "connected," "coupled," "interconnected," and similar refer to a relationship wherein structures are secured or attached to one another either directly or indirectly through intervening structures, as well as both movable or rigid attachments or relationships, unless expressly described otherwise.

As used throughout, any ranges disclosed herein are used as shorthand for describing each and every value that is within the range. Any value within the range can be selected as the terminus of the range. In addition, all references cited herein are hereby incorporated by reference in their entireties. In the event of a conflict in a definition in the present disclosure and that of a cited reference, the present disclosure controls.

For non-limiting exemplary purposes, the cask/canister cooling system and related methods discussed herein will be described in connection with transport casks used to the transport, store and handle high level radioactive waste such as spent nuclear fuel ("SNF"). However, the invention is not limited in its applicability to casks handling SNF alone, and can be utilized to cool casks emitting heat used to handle any type of high level nuclear waste, including for example without limitation without limitation burnable poison rod assemblies ("BPRA"), thimble plug devices ("TPD"), control rod assemblies ("CRA"), axial power shaping rods ("APSR"), wet annular burnable absorbers ("WABA"), rod cluster control assemblies ("RCCA"), control element assemblies ("CEA"), water displacement guide tube plugs, orifice rod assemblies, vibration suppressor inserts and any other radioactive materials. The SNF and foregoing waste materials may collectively be referred to as "nuclear waste" herein all of which are radioactive. Moreover, while this invention is focused on cooling of casks containing high level nuclear waste, it can be applied to cool any type of nuclear-related or non-nuclear vessels with heat producing contents that need to be kept cool for operational reasons.

FIGS. 1-14 show one non-limiting embodiment of a vertically oriented cask 20 containing spent nuclear fuel (SNF) which may utilize the cooling water system according to the present disclosure. However, the present cooling system can be used with a cask in other orientations such as casks in a horizontal or inclined orientation. The heat extraction effectiveness of the cask cooling system may be influenced by the orientation of the cask, but the present invention is equally applicable to such alternate orientations. An embodiment of the cask cooling system for horizontally orientated nuclear fuel storage/transport casks is disclosed later herein.

Referring now to FIGS. 1-14, a cask such as a transfer cask 100 may be cooled by the present water cooling. Cask 100 may be an elongated vessel having a cylindrical body defining a longitudinal axis LA. Cask 100 includes a top end 122, a bottom end 123, cylindrical sidewall 124 extending between the ends, and an internal longitudinal cavity 144. Cask 100 further includes an internal surface 101 defining cavity 144 and an opposite external surface 102 facing the ambient environment.

Cavity 144 of cask 100 extends for substantially a full height of the cask along the longitudinal axis LA from the top to bottom end. Cavity 144 is configured to hold and a conventional unshielded nuclear spent fuel (SNF) canister 160 therein (shown in FIGS. 3 and 10). The cask cavity 144 preferably has a transverse cross-sectional area configured to hold no more than a single spent nuclear fuel canister 160, which in turn defines an internal canister cavity 162 that holds a plurality of conventional SNF assemblies 165 each of which contain multiple fuel rods. One or more fuel assemblies 165 are disposed in conventional gridded fuel basket 164 inside canister 160; a few of which are represented schematically in FIG. 10 by hatching as such assemblies are well known in the art. Canister 160 includes an unshielded cylindrical body and a sealable top lid 161 which can be seal welded to the body to close cavity 162. A typical nuclear fuel canister may hold approximately 89 fuel assemblies at full capacity as one non-limiting example.

Figure 3:
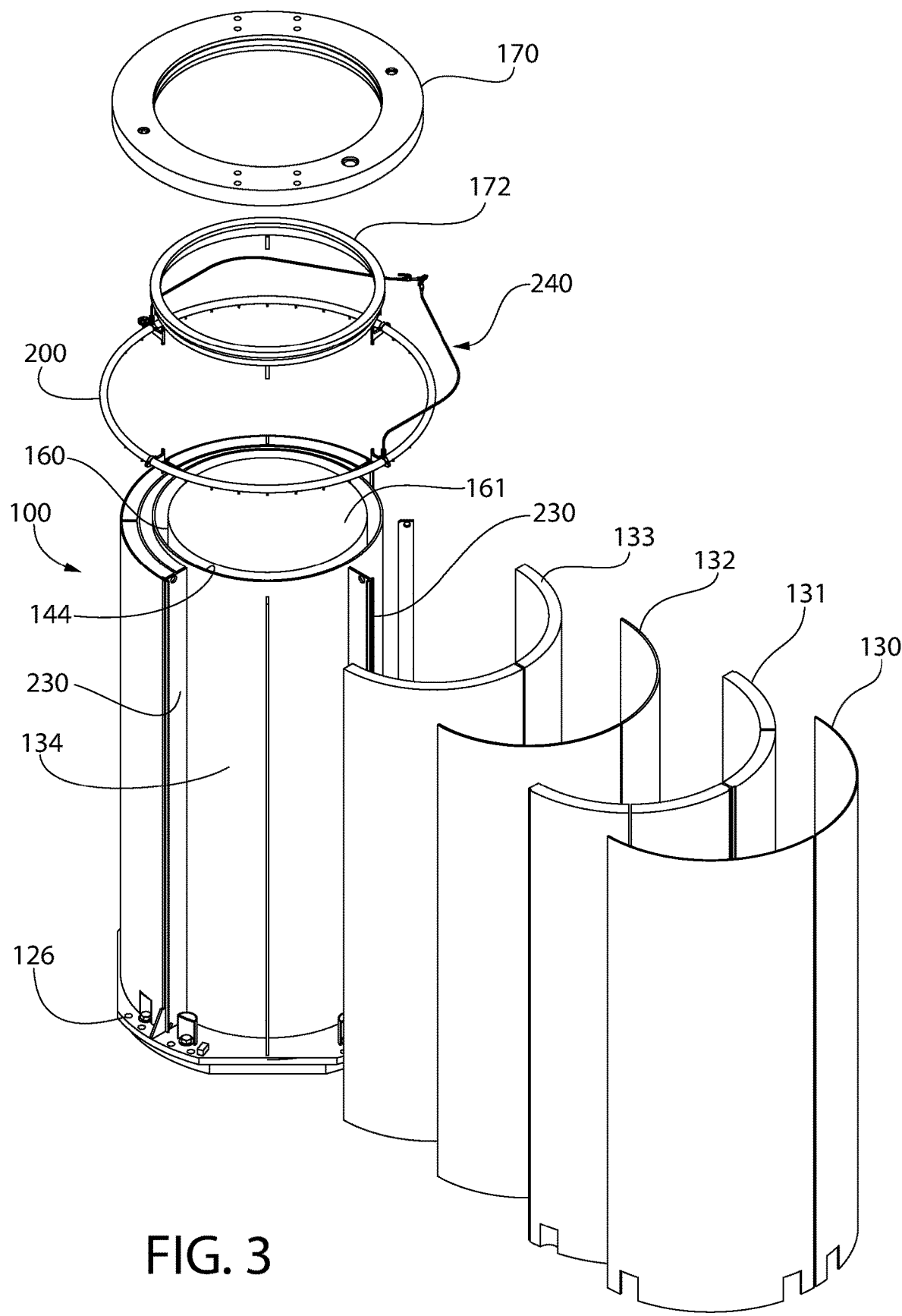
FIG. 3 is an exploded top view thereof.
Figure 4:
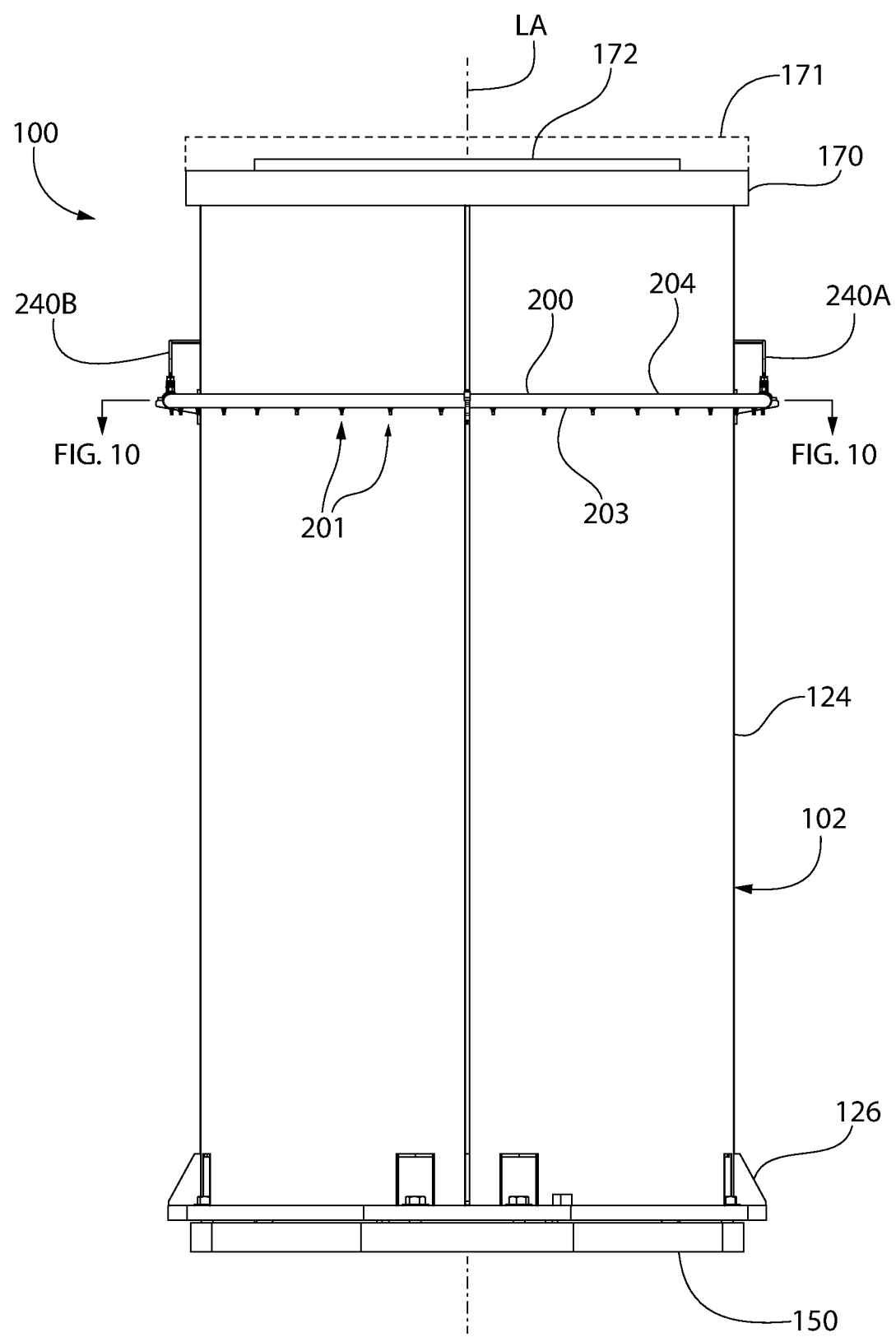
FIG. 4 is a first side view thereof.
Figure 5:
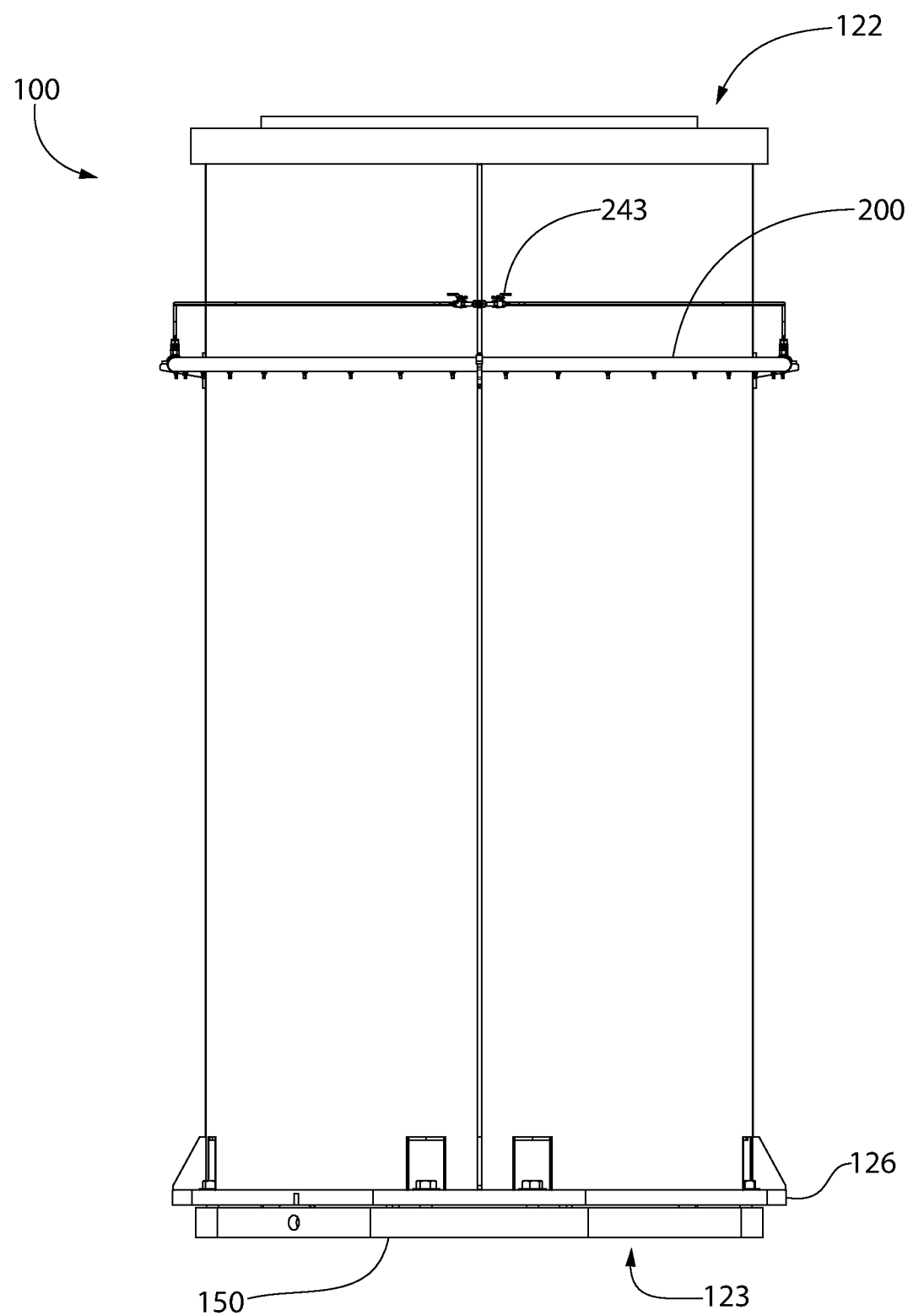
FIG. 5 is a second side view thereof.
Figure 6:
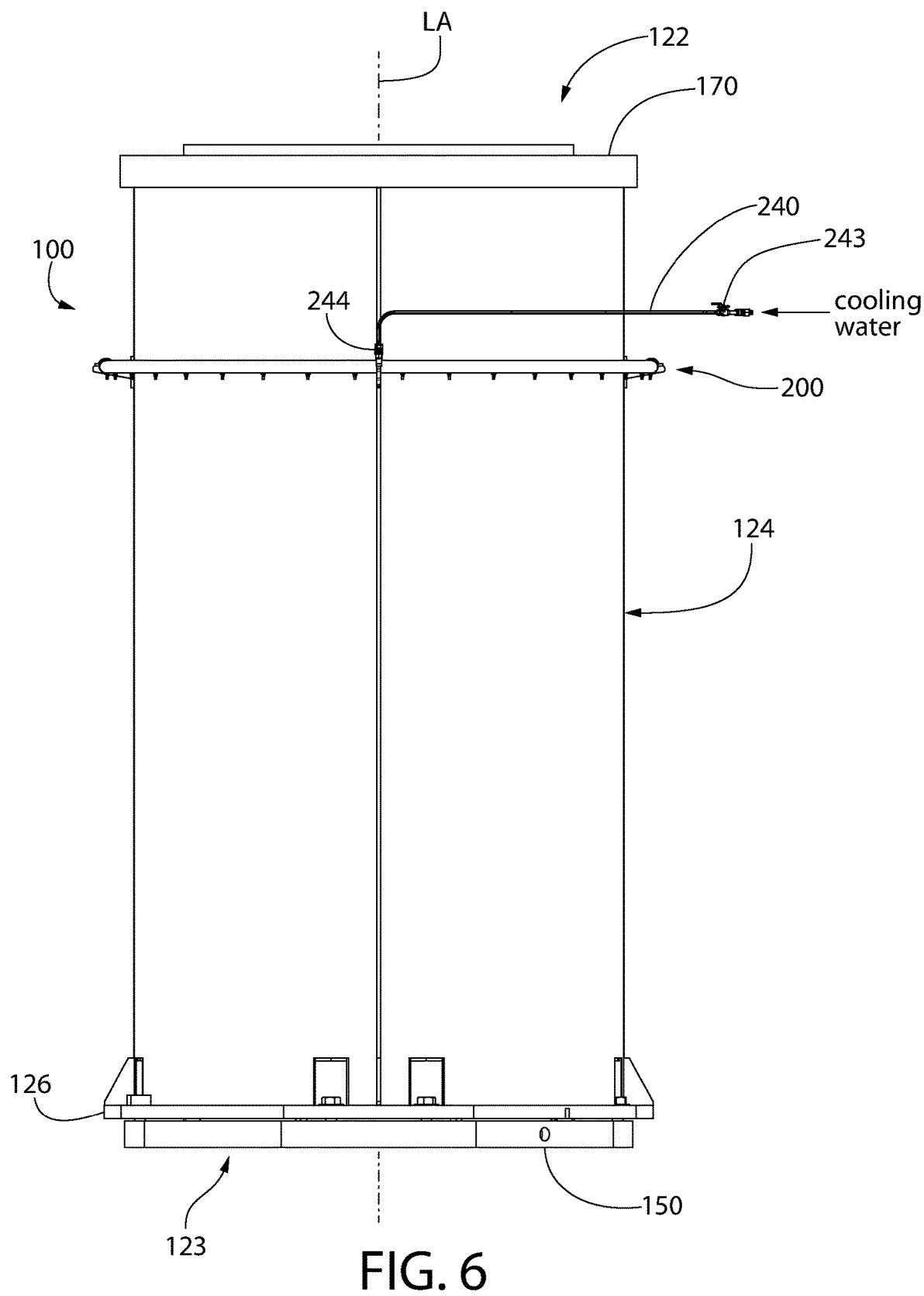
FIG. 6 is a third side view thereof.
Figure 7:
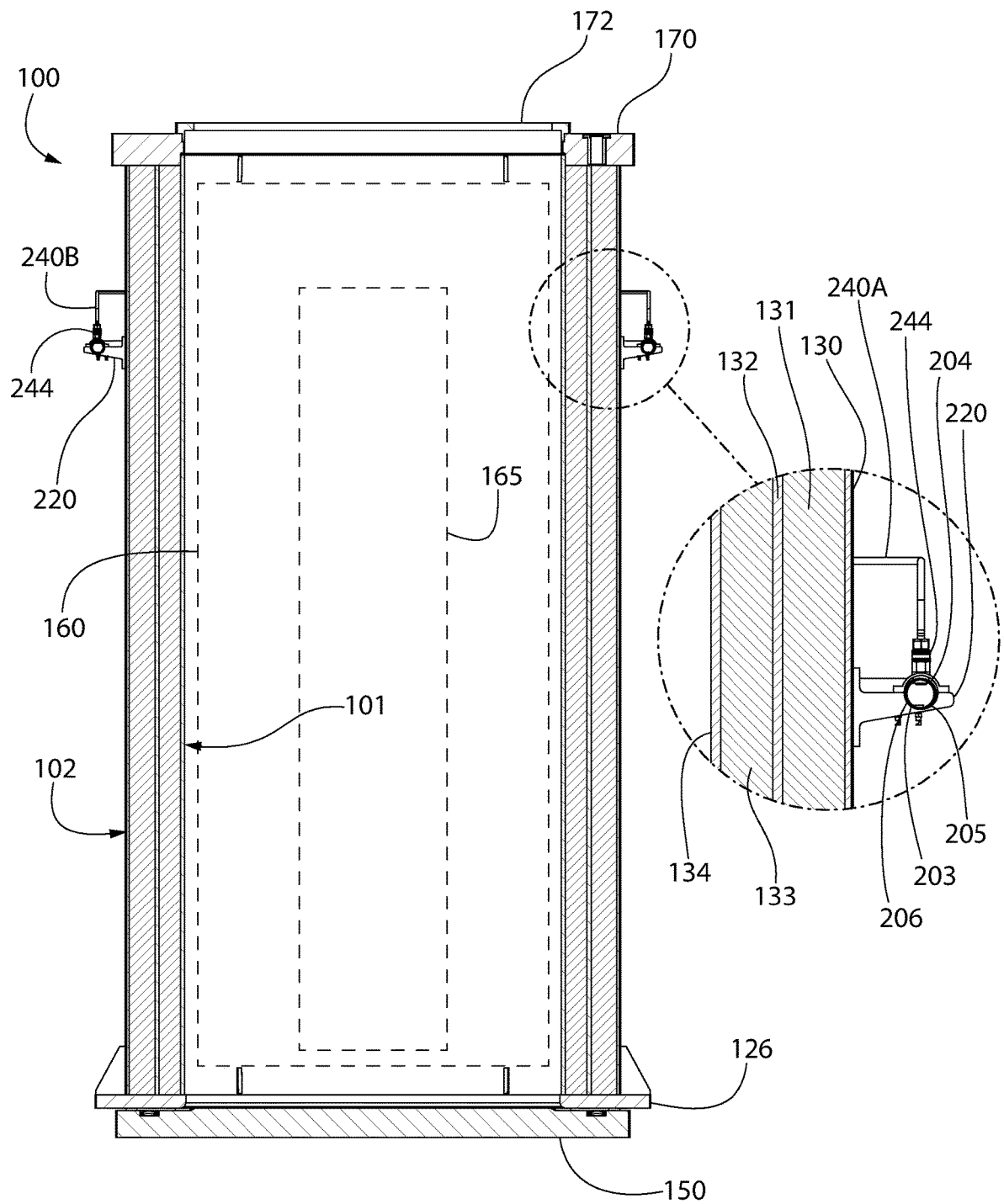
FIG. 7 is a side longitudinal cross-sectional view thereof.
Figure 10:
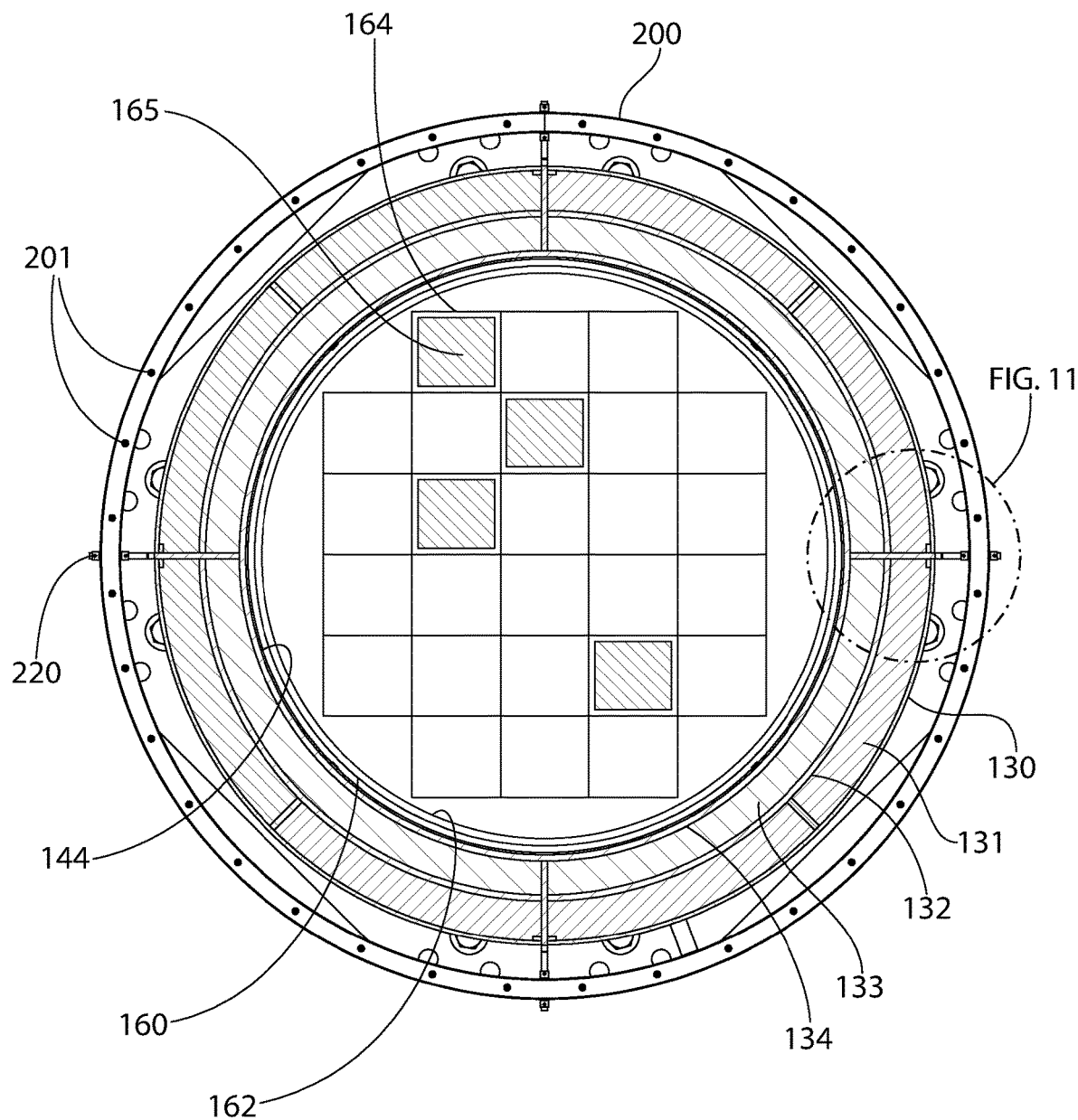
FIG. 10 is a transverse cross sectional view.

Referring particularly to FIGS. 3 and 10, cask 100 includes radiation shielding to prevent transmission of neutron particles and gamma rays to the external ambient environment surrounding the cask. Sidewall 124 of cask 100 accordingly may have a composite multi-shell wall construction comprising concentrically arranged outer shell 130, inner shell 134, and intermediate shell 132 disposed therebetween. A gamma blocking liner 131 is interposed and sandwiched between outer shell 130 and intermediate shell 132. In addition, a neutron attenuation shielding media 133 is interposed and sandwiched between inner shell 134 and intermediate shell 132 to complete the nuclear radiation shielding. The shells may be formed of a suitable metal of sufficient structural strength and thickness, such as without limitation stainless steel for corrosion protection as one example.

The gamma blocking liner 131 may be preferably constructed of a high density and high thermally conductive metallic material(s) selected and operable to block gamma radiation. Suitable materials which may be used that meet those criteria include steel, lead, or copper as some non-limiting examples. In one embodiment, the liner 131 may comprise lead. The neutron shielding media 133 may be a boron-containing material for neutron attenuation. In one embodiment, the neutron shielding may be a solid material such as Holtite™ available from Holtec International of Camden, N.J. which is formulation comprising hydrogen rich polymer impregnated with uniformly dispersed boron carbide particles. Other boron containing materials may be used. In other embodiments, the neutron shielding media 133 may be liquid such as water containing boric acid. In either the case of a solid or liquid neutron shielding media, the media may be completely enclosed or encased between inner and intermediate shells 134 and 132.

The bottom end 123 of cask 100 may include a gusseted annular bottom support flange 126 for supporting the cask during transport and stiffening of the sidewall 124 of the cask. Flange 126 extend radially outwards beyond sidewall 124 and circumferentially completely around the cask. The flange 126 is configured and arranged to engage a platform surrounding a mating receptacle of a conventional self-propelled wheeled or tracked vertical cask transport vehicle or crawler used to transport the fully loaded cask 20 with loaded fuel canister. Such cask transporters are well known in the art and commercially available from manufacturers such as Enerpac Heavy Lifting Technology and others. The bottom end 123 of the cask 100 projects downwards below support flange 26 into the upwardly open receptacle of the crawler and may not engage any structural surface of the transport vehicle for support. Accordingly, the bottom support flange 126 essentially supports the entire weight of the cask 100 and spent fuel contained therein.

The cavity 144 at the bottom end 123 of cask 100 may be closed by a detachable bottom lid 150. Lid 50 protrudes vertically downwards below the bottom support flange 126 and bottom end 123 of cask 100. The bottom lid 50 is constructed to support the spent fuel canister 160 which rests on the planar horizontal top surface of lid, which is of suitable thickness for this purpose without undue deflection from the weight of the canister.

Bottom lid 150 may be removably coupled to bottom end 123 of cask 100 via any suitable means, such as via fasteners such as threaded fasteners in one embodiment. In other embodiments, lid 150 may be permanently attached to cask 100 such as via hermetic seal welding to provide a liquid and air leak proof coupling.

With continuing general reference to FIGS. 1-14, the top end 122 of the cask 100 may be terminated by an annular top mounting flange 170 configured for mounting a top lid 171 (represented in dash lines in FIG. 4) thereto. Flange 170 projects radially/laterally outwards beyond the sidewall 124 of cask 100. An annular collar 172 mounted to the top of the buttstock body projects upwards through and beyond the central opening of the flange 170. The collar 172 may assist with mounting and sealing the cask top lid 171 to the mounting flange 170 and cask. Lid 171 may be detachably mounted to the top mounting flange 170 by any suitable means, such as a plurality of mounting fasteners or welding as some non-limiting examples. Any suitable configuration of lid 171 may be used.

The cask cooling system will now be described.

Referring now to FIGS. 1-14, the cask cooling system generally comprises a ring-shaped or annular cooling water header 200 detachably mounted to cask 100 in one embodiment. Header 200 has an annular body which extends in a circular configuration completely around the circumference of the cask sidewall 124. Header 200 defines and circumscribes a central spaced configured to receive the cask. In one preferred embodiment as illustrated, header 200 may be continuous in structure and completely encircles cask 100 for a full 360 degrees to uniformly wet the entire circumference thereof. A continuous circular internal flow path and pressure retention boundary defined inside the header 200 is thus provided. The cooling water header may be provided as single prefabricated circular unit which can be slipped over the top end of the cask and positioned on its mounting brackets 220, as further described herein.

Figure 8:
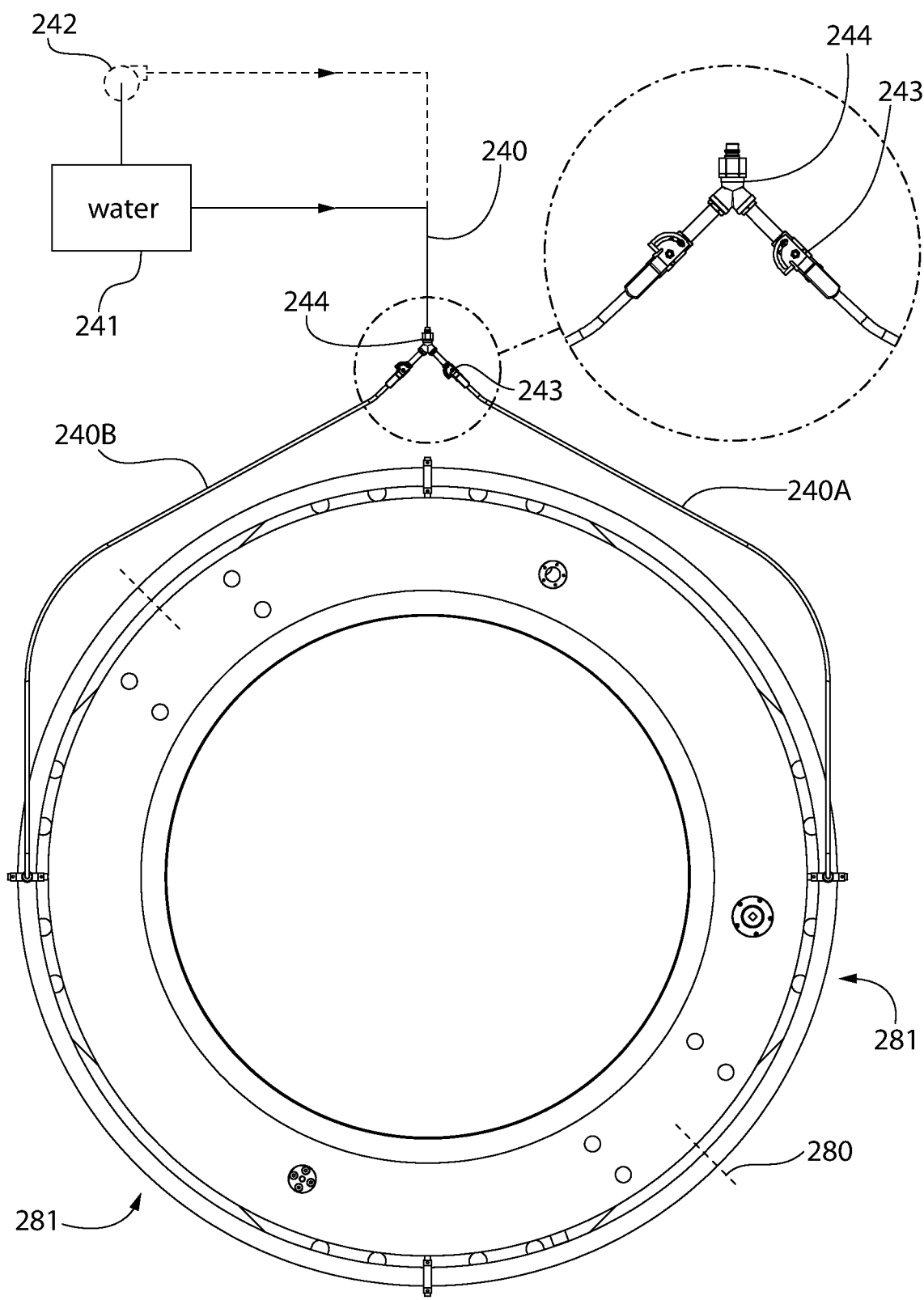
FIG. 8 is a top view thereof.
Figure 9:
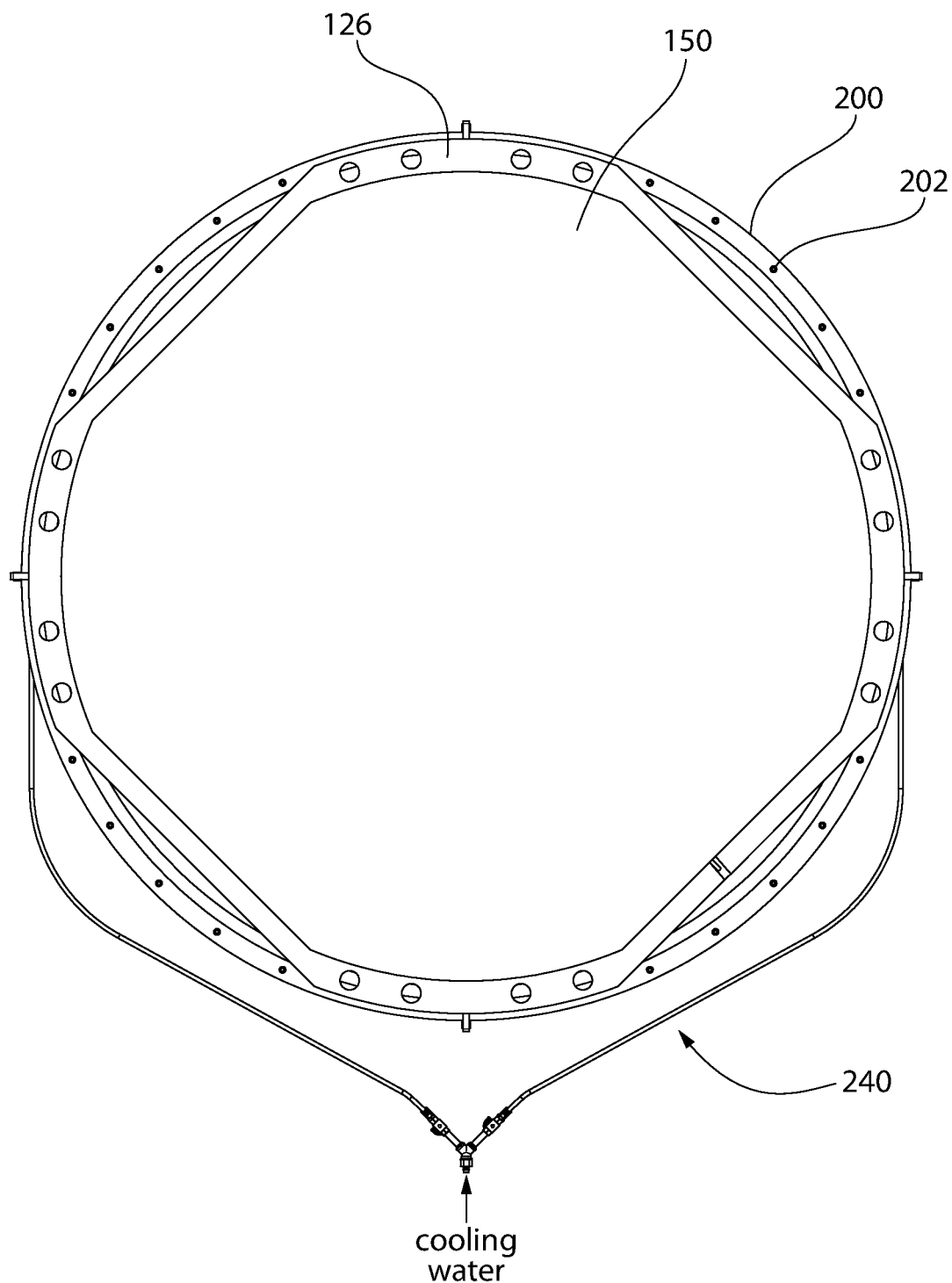
FIG. 9 is a bottom view thereof.

In other possible embodiments, the cooling water header 200 may alternatively be provided as multiple (i.e. 2 or more) arcuately shaped header sections or segments which may be assembled and fluidly coupled together end-to-end in leak-resistant manner via suitable commercially-available fluid end couplings (e.g. bolted pipe flanges, threaded tube connections, etc.) after emplacement around the cask 100. This allows the multiple header sections to be positioned proximate to the cask in a lateral direction on its supports as opposed to slipping the one-piece header unit described above over the top end of the cask 100 which may more convenient for both installation and handling in some situations. FIG. 8 shows one of embodiment of the possible arrangement and location of piping/tubing joints 280 in header 200, which in this non-limiting example is formed by two semi-circular header sections 281 coupled together at the joints. Each header section is supported by two mounting brackets 220. Once the header sections 281 are assembled and fluidly coupled together, a continuous circular internal flow path and pressure retention boundary is established the same as the one-piece header.

In yet other possible embodiments, the cooling water header 200 may alternatively be provided as multiple (i.e. 2 or more) arcuately shaped header sections or segments which may not be fluidly coupled together end-to-end. For the foregoing example of two header semi-circular header sections 281 (referring to FIG. 8), each section may be simply terminated at both ends by a conventional end cap fitting such that one section is not in fluid communication with the other section. To ensure complete and uniform wetting of the cylindrical sidewall 124 of the cask 100, however, each header section 281 preferably should terminate in close and adjacent proximity to each other at their ends at a location similar to where the joints 280 are indicated in FIG. 8. Each of the fluidly isolated header sections 281 in this example are fed cooling water by a separate supply line 240A, 240B as shown.

In all of the above embodiments and variations of the cooling water header 200 construction described, the preferred installed cooling water header configuration is generally circular and annular overall even when formed from multiple fluidly coupled or isolated header sections.

With continuing general reference to FIGS. 1-14, cooling water header 200 is positioned around the upper half and portion of cask 100 to deliver cooling water to the upper surface of the cask sidewall 124. Preferably, header 200 is spaced downwards from the top of the cask by a sufficient distance to prevent interfering with making the canister lid 161 to canister 160 circumferential hermetic seal weld previously described herein. In one non-limiting embodiment, header 200 may be positioned at an elevation below the top of the fuel canister 160 when placed inside the cask, but at a position equal to 60% or more than a height of the canister for optimum cooling of the cask and canister therein. This positioning balances the need to cooling the cask and canister while avoiding interference with the canister lid welding operations which may be performed simultaneously while the cask is being cooled by the cooling system.

Cooling water header 200 may have a conventional circular cross sectional shape in one embodiment. Header 200 includes a top surface 204, bottom surface 203, outer surface 205, and inner surface 206 facing the cask when positioned inside the header (see, e.g. FIGS. 7 and 12-13).

Cooling water header 200 may be formed of suitable piping or tubing (collectively a "flow conduit") of suitable diameter selected to provide the desired rate of flow. Any suitable metallic material or non-metallic material (e.g. plastic) may be used. If metal is used, the material selected is preferably corrosions resistant such as for example without limitation aluminum or stainless steel. Header 200 preferably may have a rigid structure in some embodiments to hold its annular shape without undue sagging between support points from the cask, further described below.

Figure 12:
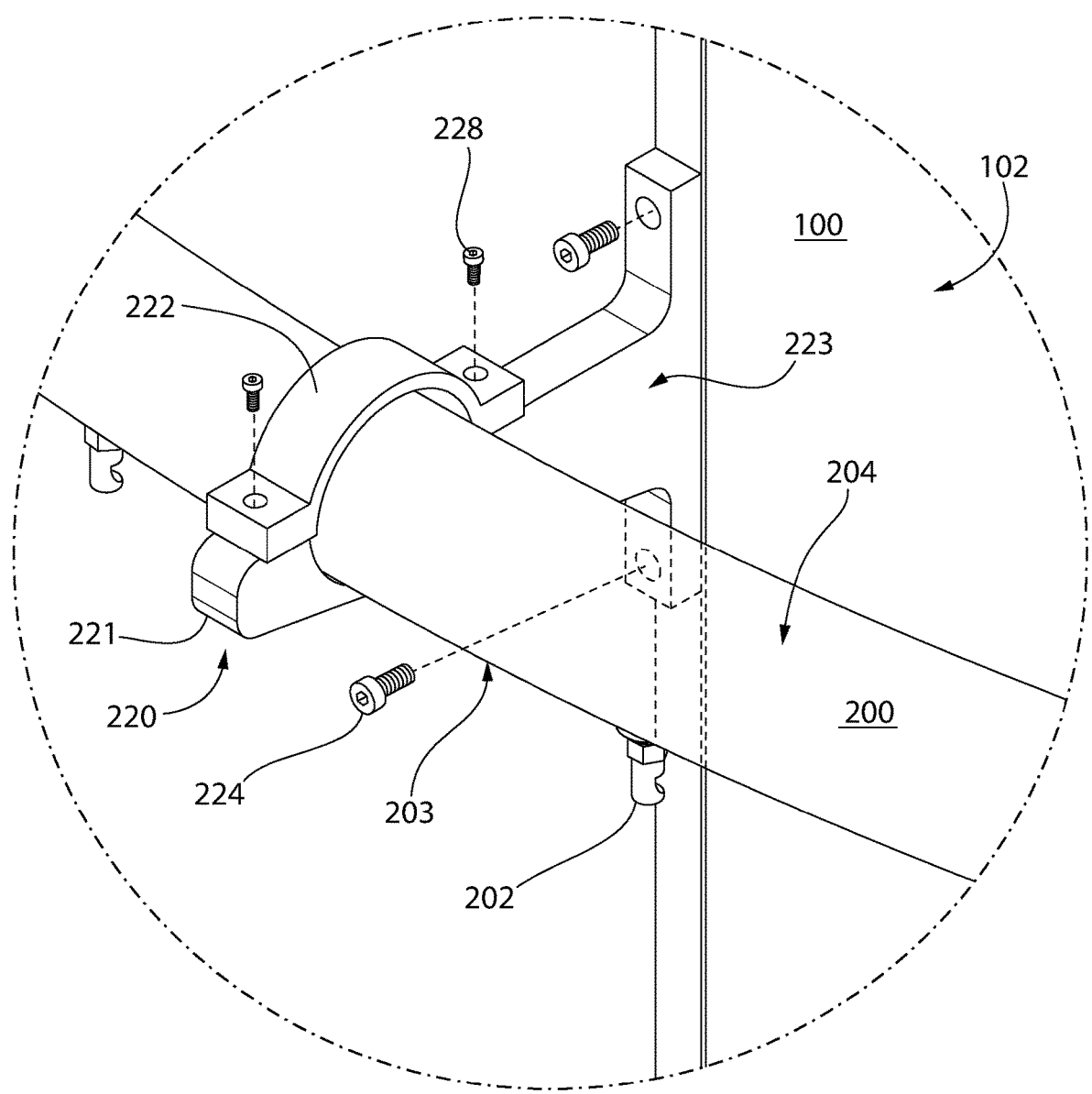
FIG. 12 is an enlarged top perspective view showing mounting details for mounting the cooling water header of the cooling water system to the cask and header water spray nozzles.
Figure 13:
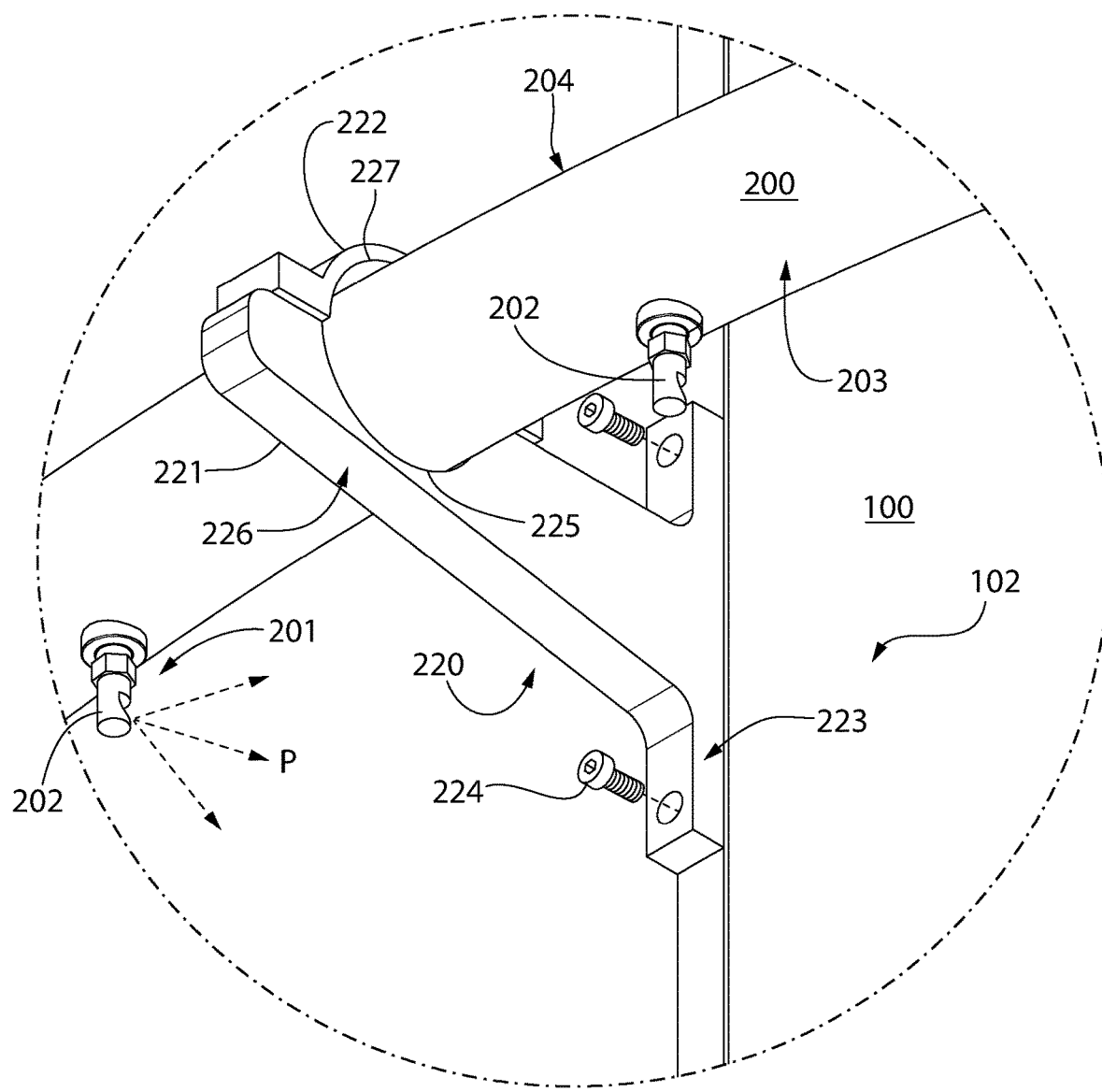
FIG. 13 a bottom perspective view thereof.
Figure 14:
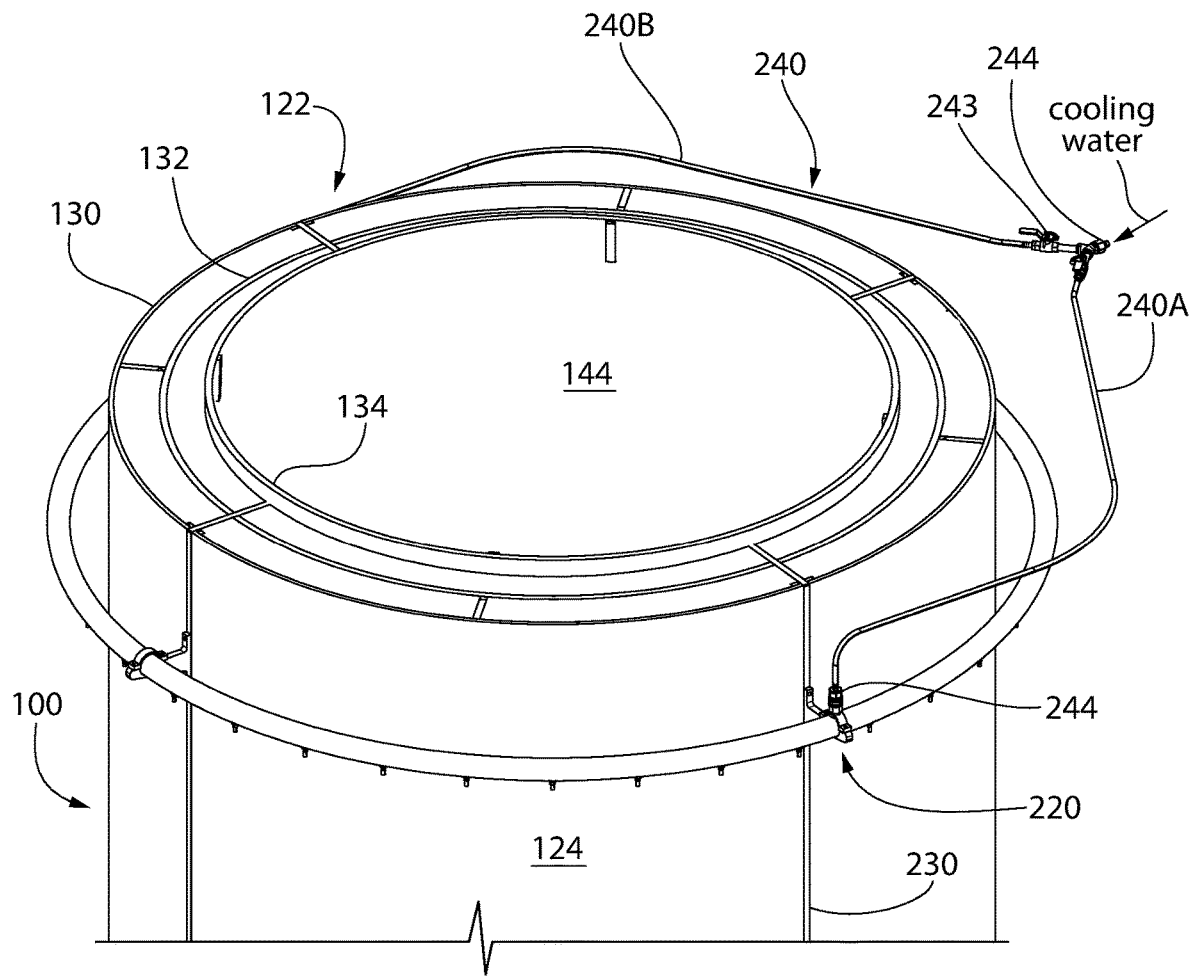
FIG. 14 is a top perspective view of the cask with cooling water header.

Cooling water header 200 comprises a plurality of water dispensing outlets 201 which are configured to direct cooling water onto and wet the external surface 102 of the cask 100. This in turn cools the canister 160 and SNF therein to prevent boiling of the water retained in the canister until welding of the lid to the canister is completed. The dispensing outlets 201 are preferably provided in number and arrangement to wet the entire cylindrical sidewall external surface 102 of cask 100 for uniform cooling. The outlets 201 may each take various forms in different implementations, including for example without limitation simply openings or orifices formed directly into the header 200 in the header in some embodiments. In other embodiments, the dispensing outlets 201 may comprise spray nozzles 202 as best shown in FIGS. 12-13 which are configured to drip or spray the cooling water onto the external surface 102 of cask 100. Each nozzle 202 is fed by a corresponding flow hole or aperture formed in the header 200 which allows the nozzle to receive pressurized cooling water flowing inside the header in a circular/circumferential flow pattern around the cask 100. In one non-limiting embodiment as shown, nozzles 202 may be arranged on the bottom surface 203 of header 200. In other possible embodiments, nozzles 202 may alternatively be arranged on the top surface 204, inner surface 206, or a combination of the top, inner, and bottom surfaces depending on the desired coverage of cooling water applied to the cask.

Nozzles 202 may be configured to provide any suitable spray pattern P to wet the external surface 102 of cask 100 as uniformly as possible. In one embodiment, a fan shaped spray pattern P may be used (see, e.g. FIG. 13). The fan shaped spray pattern permits overlap of spray from adjacent (but spaced apart) nozzles to minimize the number of nozzles required to uniformly wet and cool the entire cylindrical sidewall external surface 102 of the cask.

Cooling water header 200 is supported directly from the cask 100 by a plurality of mounting brackets 220. Brackets 220 may be detachably mounted to the cask in one embodiment. This permits the cooling water header to be used only for those casks having high thermal output energy which are in need of external cooling to prevent boiling of the water remaining in the canister 160 from the fuel pool until the canister lid to canister hermetic seal weld can be completed.

Referring to FIGS. 12-13, brackets 220 each have a radially elongated body comprising a lower base portion 221 and detachable upper securement portion 222. Base portion 221 includes an inner mounting end 223 configured to receive threaded fasteners 224 to couple the base portion to the external surface 102 of cask 100 (i.e. cylindrical sidewall 124). Two fasteners may be used to complete a stable coupling in one embodiment as shown. The cask 100 may include predrilled and tapped threaded holes to receive the fasteners 224. Base portion 221 further includes an outer supporting end 226 which is configured to seat the cooling water header 200 thereon. In one embodiment, supporting end 226 defines an upwardly open concave cradle 225 of semi-circular shape on which the lower half of header 200 rests. Cradle 225 is complementary configured in radius to the diameter of the header for a relatively snug engagement therebetween. The upper securement portion 222 is generally U-shaped defining a downwardly open concave receptacle 227 which is complementary configured to cradle 225 in shape and radius. Receptacle 227 covers the upper half of header 200. Threaded fasteners 228 may be used to detachably couple the securement and base portions 222, 221 together to trap and lock the cooling water header 200 to the mounting brackets 220 as shown.

Figure 11:
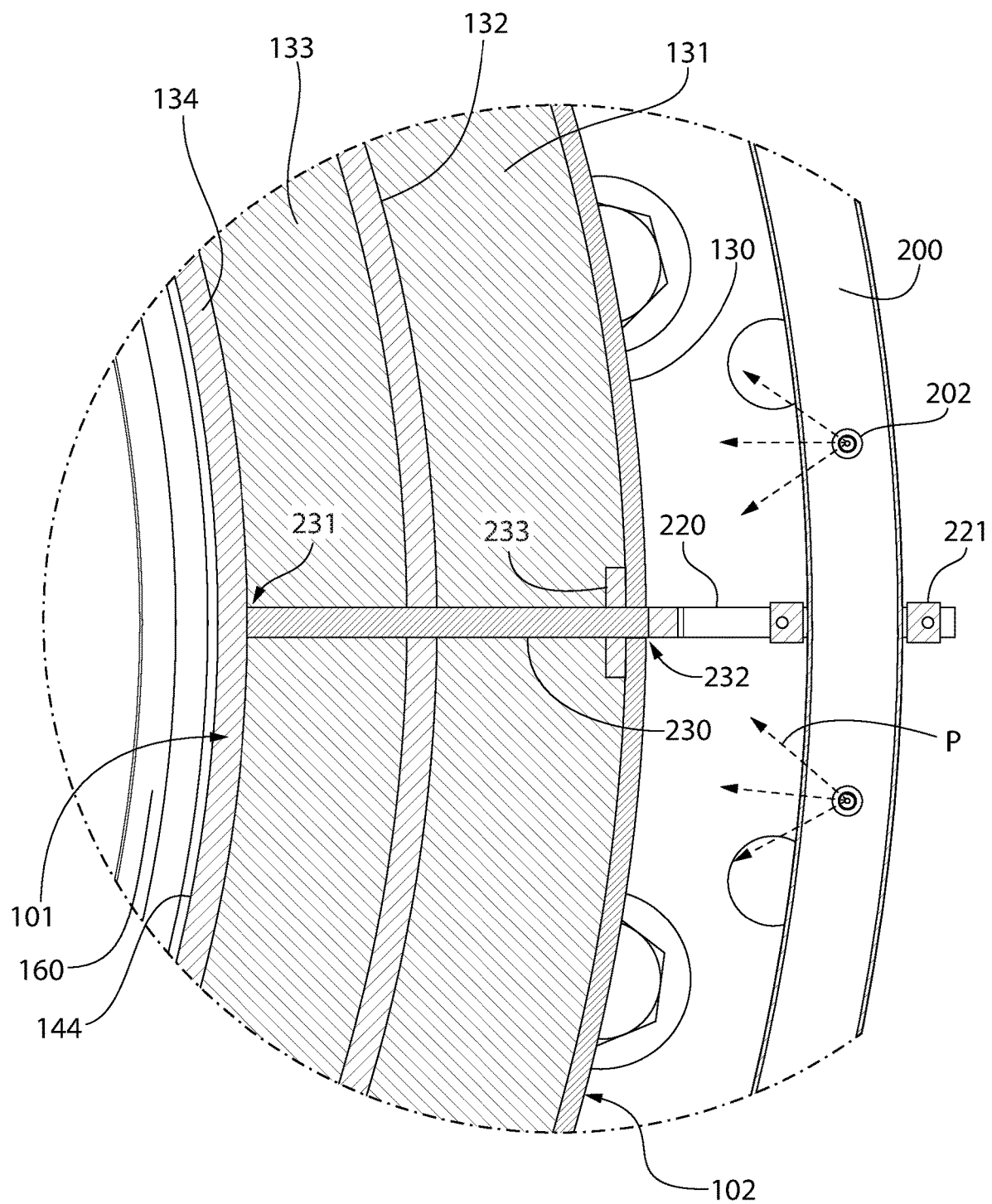
FIG. 11 is an enlarged detail from FIG. 10.

In some embodiments as shown in FIGS. 3 and 10-11, the mounting brackets 220 may be mounted via fasteners 224 to vertically elongated longitudinal reinforcement plates 230 fixedly incorporated into the structure of the cask 100. Reinforcement plates 230 may extend for the full height of the cask sidewall 124. Plates 230 extend in a radially outward direction from inner shell 134 to outer shell 130 of the cask. An inboard end 231 is rigidly affixed to inner shell 134 such as via welding and an opposite outboard end 232 are rigidly affixed to outer shell 130 such as via welding. Reinforcement plates 230 may have a T-shaped transverse cross section including a circumferential portion 233 proximate to outboard end 232 to facilitate alignment of shell section edges for welding together where the cask is comprises of multiple arcuate sections assembled together (see, e.g. FIG. 3). The reinforcement plates 230 provide a convenient and robust location for securing the mounting brackets 220 to the cask. However, the brackets need not be secured to the plate locations only and any suitable locations on the external surface 102 of the sidewall 124 of cask 100 may be used for mounting the header mounting brackets.

When the cooling water header 200 is mounted to the mounting brackets 220 the header is supported in a cantilevered manner from the cask 100. Header 200 may be entirely supported from the cask 100 by the brackets in some embodiments as illustrated. Brackets fixedly hold the header in spaced apart relation to the external surface 102 of the cask. The radial distance selected between the cask 100 and header 200 is selected to allow uniform wetting of the entire outer surface of the cask with the cooling water spray delivered from spray nozzles 202. In one embodiment, brackets 220 are preferably made of a suitable corrosion resistant metal such as aluminum, stainless steel, galvanized steel, or other. Any suitable number of brackets 220 may be used to support the header 200 preferably without undue sagging between the brackets. In the illustrated embodiment, four brackets are used (one to support the cooling water header 200 in each quadrant). The number of brackets 220 and spacing may be determined by the material and weight of the cooling water header to be supported.

It bears noting that other types and configurations of mounting brackets 220 may be used in other embodiments.

Cooling water header 200 is fluidly coupled to a suitable source of cooling water via water supply line 240 (see, e.g. FIG. 8). In one embodiment, a reservoir such as cooling water tank 241 holding a supply of cooling water may provide the source. Cooling water is delivered to water supply line 240 and header 200 in turn at pressure based on the static pressure head created in the tank without the assistance of pump, thereby creating a passive system which does not rely on the availability of electric or other power (e.g. gasoline) for operation. The cooling water flows by gravity from the tank 241 to the header 200 and spray nozzles 202 via the available static pressure head. The flow rate of cooling water may decrease over time as cooling water is consumed and the surface level of remaining water in the tank continually drops. In one embodiment, the cooling water tank 241 may be located at an elevation above the cask 100 so that the flow of cooling water remains completed gravity driven.

In other possible embodiments where it may not be possible to locate the cooling water source conveniently above the cask 100, pumped cooling water may be used. In this case, the water supply line 240 may alternatively be fed with cooling water delivered by one or more powered cooling water pumps 242 (shown in dashed lines in FIG. 8) which provide a pressurized source of water to cooling water header 200 independently of the elevation of the cask 100 and water source relative to each other. Pump(s) 242 may be electrically driven or powered by a gasoline engine in some embodiments. The pumps may take suction from any available source of cooling water, such as cooling water tank 241. Tank 241 may be located at the same elevation (e.g. grade or ground level) as the cask 100 in this embodiment of the cooling system.

In the case of either a gravity driven passive cooling water system or a pump pressurized cooling water system, the cooling water tank 241 may be portable and supported on movable base or platform, which can be transported via fork lift, crane, hoist, or other motorized lifting apparatus. In the case of the gravity driven cooling water system, the lifting apparatus may be used to elevate and hold the cooling water tank 241 above the top of the cask to ensure that the header 200 does not run dry as long as water is available in the tank. The bottom of tank 241 may therefore be higher than the top of the cooling water header 200 in some arrangements.

In one embodiment, water supply line 240 may be bifurcated into a first branch 240A and second branch 240B at the cask 100 to provide two separate points of cooling water supply to the cooling water header 200. This ensure a more uniform supply and distribution of cooling water to the nozzles 220 of the header. The supply of cooling water may be controlled (e.g. open for flow, closed to stop flow, or throttled therebetween) via one or more water supply valves 243. A separate valve may be used for each branch 240A, 240B to balance the cooling water flow.

Water supply line 240 may be comprises of any suitable piping or tubing which may be metallic or plastic. Supply line 240 may be flexible or rigid in structure. In one embodiment, as shown, tubing may be used. Supply line 240 may be fluidly coupled to cooling water header 200 via suitable commercially-available flow fittings 244 (best shown in FIG. 7).

Operation of the cooling water system will now be briefly described for cooling cask 100 containing high level radioactive waste emitting heat via the following method, recognizing that numerous variations in the method may be used.

A source of cooling water for cask 100 is provided. The source may be water tank 241. If a gravity fed cooling wat system is to be used, the tank may be raised by a lifting apparatus at least partially above the cask such that the bottom of the tank is above level at which the cooling water header will be mounted to the cask. The cask 100 is provided, which may be staged and be located at grade or ground level (e.g. an operating floor inside a nuclear facility building or cask staging pad outside) in some embodiments. The cooling water header 200 may then be is detachably mounted to cask 100, such as via mounting brackets 220. The cooling water source is then fluidly coupled to cooling water header 200 by fluidly coupling water supply line 240 to the header at one end and to water tank 241 at the other end if a gravity fed cooling water system is used. If pumped, the supply line 240 is fluidly coupled to the pump(s) 242. The flow of cooling water to the header 200 is initiated by at least partially opening supply valves 243 (assuming two are provided as described above). A single supply valve 243 may be used, in which case that single valve is opened.

The method continues by flowing cooling water in an arcuate or circular flow path around the cask 100 inside cooling water header 200, and directing the cooling water radially inwards onto the cask external surface 102 from the plurality of water dispensing outlets 201 (e.g. spray nozzles 202) on the cooling water header. The cooling water wets the external surface 102 of cylindrical sidewall 124 of the cask and flows downwards from the top to bottom along the cask. The cooling water flow cools the cask 100 forming a heat sink which absorbs the heat emitted by the radioactive waste contained in the canister 160 inside the cask. When the cask is sufficiently cooled, the water supply may be terminated to the cooling water header 200 by closing valves 243. The water supply line 240 may be uncoupled from the header 200. The cooling water header may in turn be detached from the cask for use with another cask having a canister with high heat load which requires cooling.

Figure 15:
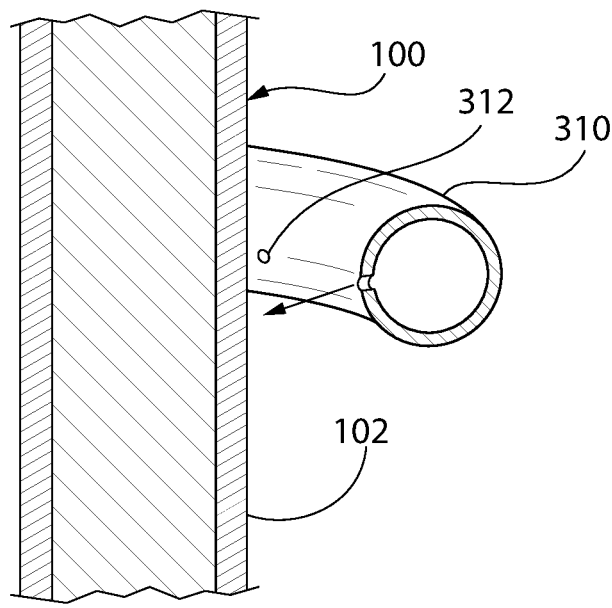
FIG. 15 is a first alternative configuration of the cooling water header.

FIG. 15 shows a first alternate embodiment of a cooling water header 301. In this embodiment, the flow dispensing outlets 201 comprise a plurality of circumferentially spaced apart flow orifices or apertures 312. The flow apertures are arranged on the inward facing inner surface 206 of header 301 to direct cooling water against external surface 102 of cask 100. Header 301 is the same as cooling water header 200 in all other aspects and mounting details including mounting brackets 220, as previously described herein.

Figure 16:
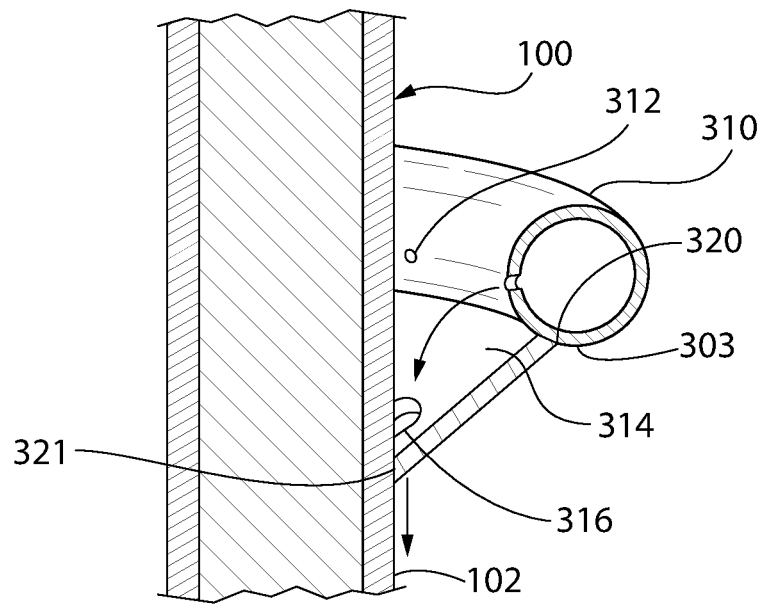
FIG. 16 is a second alternative configuration thereof.

FIG. 16 shows the addition of an annular flow guide or director 314 to the cooling water header 301 assembly. Flow director 314 may extend from header 301 radially inwards towards external surface 102 of cask 100. Flow director 314 may be fixedly attached secured at its outer peripheral circumferential edge 320 to the bottom surface 303 of the header. The inner peripheral circumferential edge 321 may detachably and abuttingly engage external surface 102 of the cask, but need not be permanently attached to the cask. The flow director 314 forms a water plenum or trough which receives cooling water from flow aperture 312 which circulates around the entire circumference of the cask. From there, a plurality of drip orifices 316 in turn are formed in flow director 314 which dispense the water downwards against the external surface 102 of cask 100 to produce a water curtain flowing downwards along the cask.

In one embodiment, the flow director 314 may be formed of a flexible elastomeric material (e.g. natural rubber or synthetic elastic polymer) which can deform against the external surface 102 of cask 100 to preferably form a leak resistant seal at the flow director to cask interface. If some leakage occurs, this is acceptable since the cooling water will still contact the external surface of the cask and flow downwards. The flow director 314 helps provide more uniform distribution and wetting of the entire circumference of the cask 100 for effective cooling and heat dissipation.

While the foregoing description and drawings represent some example systems, it will be understood that various additions, modifications and substitutions may be made therein without departing from the spirit and scope and range of equivalents of the accompanying claims. In particular, it will be clear to those skilled in the art that the present invention may be embodied in other forms, structures, arrangements, proportions, sizes, and with other elements, materials, and components, without departing from the spirit or essential characteristics thereof. In addition, numerous variations in the methods/processes described herein may be made. One skilled in the art will further appreciate that the invention may be used with many modifications of structure, arrangement, proportions, sizes, materials, and components and otherwise, used in the practice of the invention, which are particularly adapted to specific environments and operative requirements without departing from the principles of the present invention. The presently disclosed embodiments are therefore to be considered in all respects as illustrative and not restrictive, the scope of the invention being defined by the appended claims and equivalents thereof, and not limited to the foregoing description or embodiments. Rather, the appended claims should be construed broadly, to include other variants and embodiments of the invention, which may be made by those skilled in the art without departing from the scope and range of equivalents of the invention.

What is claimed is:

1. A system for cooling high level radioactive waste comprising:
a cask comprising an external surface and an internal storage cavity containing the high level radioactive waste;
a cooling water header encircling the cask, the cooling water header fluidly coupled to a water source; and
a plurality of circumferentially spaced apart water dispensing outlets arranged on the header, the dispensing outlets configured to direct cooling water supplied to the header onto the external surface of the cask to cool the cask.

2. The system according to claim 1, wherein the cooling water is detachably mounted to the external surface of the cask.

3. The system according to claim 2, further comprising a plurality of circumferentially spaced apart mounting brackets detachably mounted to the cask, the cooling water header supported by the mounting brackets.

4. The system according to claim 3, wherein the mounting brackets are radially elongated and support the cooling water header in a cantilevered manner.

5. The system according to claim 3, wherein the mounting brackets are mounted to the cask by threaded fasteners.

6. The system according to claim 1, wherein the cooling water header has a circular shape and is radially spaced apart from the cask.

7. The system according to claim 6, wherein the cooling water header has a continuous annular structure which extends circumferentially around the cask for a full 360 degrees.

8. The system according to claim 1, further comprising a cooling water supply line fluidly coupled to the cooling water header, the supply line in turn fluidly coupled to a water source.

9. The system according to claim 8, wherein the water source is a tank containing cooling water having a static pressure head.

10. The system according to claim 8, wherein the water source is at least one cooling water pump operable to pressurize and pump the cooling water to the cooling water header.

11. The system according to claim 1, wherein the water dispensing outlets comprise spray nozzles configured to direct the cooling water inwards onto the external surface of the cask.

12. The system according to claim 11, wherein the spray nozzles protrude downwards from a bottom of the cooling water header.

13. The system according to claim 11, wherein each spray nozzle is configured to dispense the cooling water in a fan spray pattern onto the external surface of the cask.

14. The system according to claim 13, wherein the fan spray patterns of the spray nozzles overlap each other to uniformly wet the external surface of the cask.

15. The system according to claim 1, wherein the water dispensing outlets comprise apertures formed in the cooling water header.

16. The system according to claim 15, further comprising an annular elastomeric flow director detachably fitted to the external surface of the cask, the flow director receiving cooling water from the cooling water header and comprising a plurality of drip orifices which direct the cooling water onto the cask.

17. The system according to claim 1, wherein the cooling water header comprises a first arcuate section and a second arcuate section arranged in adjacent end to end relationship around the cask to collectively form a circular shape.

18. The system according to claim 17, wherein the first and second arcuate sections are fluidly coupled together at joints formed between the sections.

19. The system according to claim 17, wherein the first and second arcuate sections are fluidly isolated from each other.

20. A method of cooling high level radioactive waste comprising:
surrounding a cask comprising an external surface and an internal storage cavity containing the high level radioactive waste which emits heat with a cooling water header; and
discharging cooling water radially inwards from the cooling water header onto the external surface of the cask from a plurality of water dispensing outlets arranged on the cooling water header.

21. The method according to claim 20, wherein the surrounding step includes supporting the cooling water header directly from the cask by a plurality of mounting brackets.

22. The method according to claim 20, wherein the dispensing outlets each comprise a spray nozzle, and the discharging step includes spraying the cooling water.

23. The method according to claim 22, wherein the cooling water is sprayed in a fan spray pattern onto the external surface of the cask.

24. An apparatus for cooling high level radioactive waste comprising:
an annular cooling water header defining a central space configured to receive a cask comprising an external surface and an internal storage cavity containing the high level radioactive waste;
a water supply line fluidly coupled to the cooling water header; and
a plurality of circumferentially spaced apart water dispensing outlets arranged on the cooling water header, the dispensing outlets configured to direct cooling water inwards towards the central space;
wherein the water dispensing outlets comprise spray nozzles configured to direct the cooling water inwards towards the central space and onto a cylindrical external surface of the cask;
wherein each of the spray nozzles is configured to form a fan spray pattern to wet the external surface of the cask when positioned in the central space.

25. The apparatus according to claim 24, further comprising a plurality of circumferentially spaced apart mounting brackets coupled to the cooling water header, the mounting brackets configured for detachable mounting to the cask.

26. The apparatus according to claim 25, wherein the cooling water header is radially spaced apart from the cask by the mounting brackets when attached to the cask.

27. The apparatus according to claim 24, wherein the cooling water header has a continuous circular structure which extends circumferentially for a full 360 degrees.

28. The apparatus according to claim 24, wherein the cooling water header comprises a first arcuate section and a second arcuate section which are fluidly coupled together to form a continuous circular flow path which collectively circumscribes the central space.

29. The apparatus according to claim 24, wherein the cooling water header comprises a first arcuate section and a second arcuate section fluidly isolated from the first arcuate section, the first and second arcuate sections arranged to form a circular configuration which collectively circumscribes the central space.

30. The apparatus according to claim 24, wherein the spray nozzles protrude downwards from a bottom of the cooling water header.

* * * * *